Jan. 9, 1940. M. R. HUTCHISON, JR 2,186,639
PHOTOGRAPHIC SHUTTER
Filed March 14, 1939
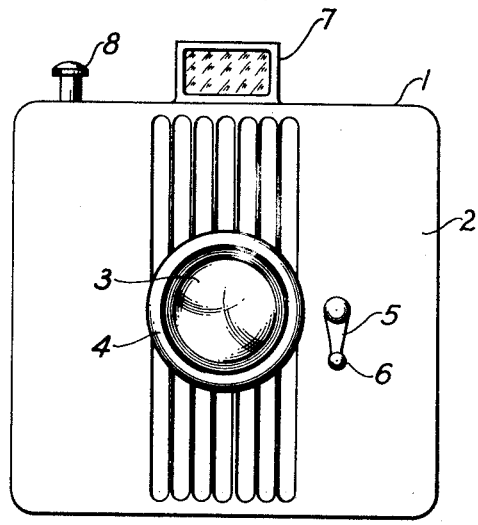
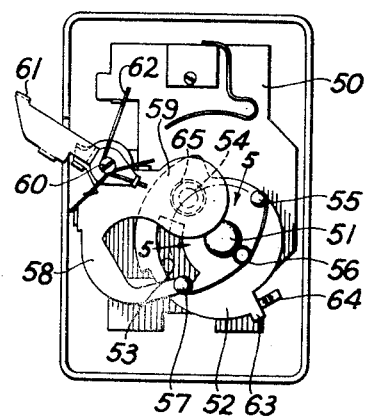
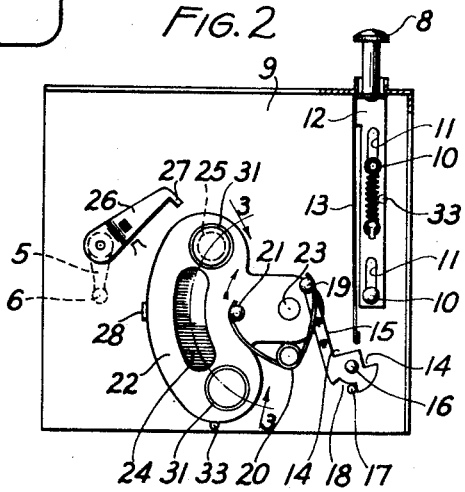
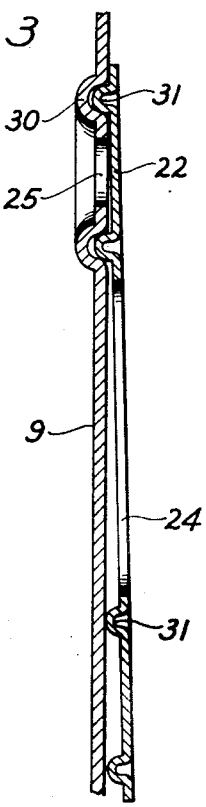
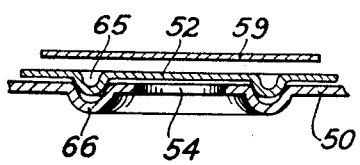
MILLER R. HUTCHISON JR.
INVENTOR
BY
ATTORNEYS Patented Jan. 9, 1940

2,186,639

UNITED STATES PATENT OFFICE 2,186,639

PHOTOGRAPHIC SHUTTER

Miller R. Hutchison, Jr., Rochester, N. Y., assignor to Eastman Kodak Company, Rochester, N. Y., a corporation of New Jersey Application March 14, 1939, Serial No. 261,712

9 Claims. (Cl. 95—60)

This invention relates to photography, and more particularly to a simple type of shutter for photographic cameras.

One object of my invention is to provide a shutter which has a positive means for making a light-tight closure completely around the aperture through which an exposure may be made. Another object of my invention is to provide a shutter with a means of preventing rebound, which means also assist in forming a light-tight connection with the shutter supporting plate. Still another object of my invention is to provide a simple and inexpensive type of shutter which requires a minimum degree of skill in assembling, and which consists of but few simple parts, and other objects will be found in the following specification, the novel features being particularly pointed out in the claims at the end thereof.

Coming now to the drawing wherein like reference characters denote like parts throughout:

Fig. 1 is a front plan view of a camera including a shutter constructed in accordance with and embodying a preferred form of my invention.

Fig. 2 is a plan view of the shutter assembly removed from the camera.

Fig. 3 is an enlarged fragmentary sectional view on line 3—3 of Fig. 2.

Fig. 4 is a plan view of a blade and cover blind type of shutter equipped with interfitting embossings in accordance with the second embodiment of my invention, and Fig. 5 is an enlarged sectional detail taken on line 5—5 of Fig. 4.

With simple types of shutters, in which a shutter blade is oscillatably mounted on a perforated plate so that the shutter may swing across the perforation and make an exposure through an opening in the shutter, it is frequently difficult to form a perfectly light-tight joint between the shutter in its positions of rest and its supporting plate due to irregularities of manufacture and due, in some instances, to the fact that the space does not permit the shutter to extend a material distance over the apertured plate. Even when the shutter may safely cover the aperture in its rest position, it frequently happens that when the shutter is suddenly brought to rest by striking an abutment, it may vibrate and thus permit light to enter and fog the film. In accordance with the construction which will be hereinafter more fully described, I have provided the shutter blade and the shutter supporting plate with cooperating embossings, preferably complemental in shape, so that these embossings both prevent light from entering between the shutter blade and the supporting plate, and also prevent rebound of the shutter blade upon completion of an exposure.

Referring to Fig. 1, the camera body 1 may include the usual front panel 2, having a lens 3 mounted in a lens cell 4 and including a time lever 5 provided with a handle 6 on the front wall of the camera. The top wall may include a view finder 7 and a trigger 8 of the type which may be depressed for making an exposure.

Referring to Fig. 2, the shutter is preferably assembled on a shutter plate 9 and the trigger 8 may be carried by the plate 9 upon a pair of studs 10 passing through slots 11 in a slide member 12 carrying the trigger.

The slide 12 carries a spring arm 13 which is adapted to engage either one of two similar notches 14 on the lever arm 15 which is mounted to swing about a stud 16 and which is limited in its movement by a post 17 lying in the notch 18 of the arm.

The lever 15 carries a stud 19 which supports one end of a hairpin spring 20, the opposite end of which encircles a stud 21 carried by the shutter leaf 22. This shutter leaf may swing about a stud 23 on which it is loosely mounted to and from the position shown in Fig. 2. The shutter blade also carries a slot 24 through which light rays pass from the aperture 25 when the shutter is swung to make an exposure.

If "time" exposures are required, the handle 6 may be moved to such a position that the lever 26 may be moved to position the hook 27 in the path of the hook 28 of the shutter blade, thus holding the blade with the slot 24 over the aperture 25 for making a prolonged exposure which may be terminated by moving the handle 6 again to the position shown in Fig. 1, this movement releasing the shutter blade.

The shutter as thus far described is of a known type. Coming now to my invention, it will be noted that the shutter plate 9, as indicated in Fig. 3, has an embossing 30 extending completely around the exposure aperture 25, and this embossing is adapted to receive a complementary-shaped embossing 31 carried by the shutter plate 22. This shutter plate carries two of these embossings, as indicated in Fig. 2, only one of which is adapted to cooperate with the embossing 30 around the aperture 25 when the shutter is at rest, the other embossing tending to tilt the shutter plate 22 at an angle to the shutter plate 9, as indicated in Fig. 3. Thus, when the trigger 8 is depressed and the lever 15 is moved to tension the spring 20, as soon as a tension is built up in this spring by the stud 19 passing the stud 21, the spring will urge the shutter plate in the direction shown by the arrow in Fig. 2. Since the spring is sufficiently heavy to cause the embossing 31 to slide up over the walls of the embossing 30, the shutter plate will rapidly move until the rounded edge of the plate strikes the stop pin 33, at which point the opposite embossing 31 will have reached the embossing 30 and will slide down into this embossing. Since the two embossings are sufficiently deep to hold the shutter blade in its position of rest, there is no possibility of the plate rebounding or vibrating to such an extent that light will be permitted to enter the aperture 25. Moreover, as indicated in Fig. 3, the two embossings form a light lock completely surrounding the aperture 25 so that in spite of the fact that the plate 22 has comparatively little overlap with the exposure aperture 25, a perfectly light-tight joint is provided.

Since the shutter plate 22 is normally made flat, except for the embossings 31, one of these embossings always rides on the surface of the plate 9 and tends to press the opposite embossing immediately into the embossing 30 when the shutter reaches its position of rest.

With the construction just described, it will be seen that by merely adding cooperating embossings to the shutter supporting plate and to the shutter blade itself, I have provided a structure which accomplishes a number of functions without the use of added parts. First, the complementary-shaped embossings provide a perfectly light-tight joint between the shutter blade and the shutter supporting plate when the shutter blade is in its position of rest. Second, the interengaging embossings tend to hold the shutter blade against movement until sufficient energy has been stored up in the spring 20 to swing the shutter blade in such a manner that one embossing leaves the other so that the shutter blade will continue to swing and light may pass through the aperture 24 until the shutter blade reaches its position of rest with the opposite embossing engaged in the shutter plate embossing. Third, as the shutter blade approaches its position of rest, one of the embossings on the shutter blade rides on the surface of the shutter plate so that as soon as the embossing 30 is reached by the opposite embossing on the shutter blade, it immediately drops down into the embossing, as indicated in Fig. 3. This is accomplished without any spring in the shutter blade itself, and is due entirely to the formation of the embossings on the shutter blade.

While it is obvious that the shape of the embossings and the position of them may be somewhat altered, I have illustrated a preferred form of embossing which can be readily formed in the metal of which the parts are made, and which are so shaped that there is little likelihood of breaking the metal during the forming operations. At the same time, the two formings are substantially complemental in shape so that it would be quite impossible for light to pass through the aperture 25 and around the embossings in such a way as to fog the film.

The embodiment I have just described illustrates a shutter of the type in which the blade moves in one direction to make one exposure and in a reverse direction to make a second exposure. Obviously, the interfitting embossings or formings are equally useful in other types of shutters, and accordingly, in Figs. 4 and 5, I have illustrated a shutter of the blade and cover blind type as a second embodiment of my invention and as illustrating a shutter of the type in which the shutter blade always moves in one direction to make an exposure and then moves in a reverse direction in returning to its initial position of rest.

In this type of shutter it is only necessary for the shutter blade to be provided with a single embossing, since the single embossing will always lie opposite the exposure opening.

In Fig. 4, there is a shutter supporting plate 50, carrying a stud 51 which movably supports the shutter blade 52. This shutter blade is provided with the usual exposure slot 53 which is so positioned relative to the stud 51 that when the shutter blade moves, it is swung past an exposure opening 54 in the plate 50 through which light rays pass to make a picture. This shutter blade is attached at 55 to one end of a hairpin spring 56, the other end of which 57 is attached to an arm 58 carried by the cover blind 59, pivoted at 60, and also carrying the trigger handle 61. A spring 62 normally holds the cover blind in the position shown in Fig. 4. In this position, the shutter blade is in its normal position of rest with the lug 63 resting against a stop 64 and with an annular embossing 65, best shown in Fig. 5, lying in engagement with a substantially complementary-shaped annular embossing 66 encircling the exposure aperture 54. In this position, of course, it is not possible for light to enter the aperture 54 and pass around the edges of the shutter blade 52.

When the trigger 61 is depressed, the cover blind 59 will move from over the top of the exposure aperture 54 and as soon as the stud 57 moves a distance sufficient to tension the hairpin spring 56 and to pass a dead center with respect to the stud 51, the shutter blade 52 moves so that the aperture 53 crosses the exposure aperture 54, making an exposure.

As in the first described embodiment, the complementary embossings 65 and 66 perform the additional useful function of tending to retain the shutter blade 52 against movement until sufficient power has been stored in the spring 56, at which time the embossing on the shutter blade slips out of the embossing on the supporting plate as the shutter swings to make an exposure. The embossing 65 will slide over the plane surface of the supporting plate 50, and after the trigger 61 is released and the cover blind covers the aperture 54, the spring 56 will again be tensioned and released so that the shutter blade may turn in the reverse direction about its pivot until the embossing 65 reaches and drops into the embossing 66 on the supporting plate. As soon as this position is reached, there is a triple light-tight joint, that is, the embossings 65 and 66 form one tight connection and the cover blind 59, which is somewhat larger in size, overlies both the shutter blade and the exposure opening. It should be noticed that when the shutter blade is swinging to its initial position of rest after an exposure has been made, the walls of the complementary-shaped embossings 65 and 66, being bent from the plane of the metal plates from which they are made, provide a braking action which beings the shutter blade smoothly to rest and at the same time prevents rebound. With this type of shutter, I have not found it necessary to provide an embossing or protuberance opposite to the embossing 65 to tilt the shutter blade as in the first embodiment of my invention, since it works entirely satisfactorily without any such arrangement. However, it would be quite possible to add on a second embossing similar to the first, but spaced on an opposite side of the pivot 1, if it should be deemed necessary.

I have described two preferred embodiments of my invention but obviously other types of shutters could be equipped with the complementary-shaped areas formed to one side of the plane of the metal of which they are made so as to form rebound checks, light-tight connections and a means for holding back the shutter blade until the spring is properly tensioned.

What I claim as my invention and desire to be secured by Letters Patent of the United States is:

1. In a photographic shutter, the combination with a supporting plate having an exposure aperture therein, a forming around the aperture, a pivotally mounted shutter blade, means for moving the shutter blade relative to the aperture to make an exposure, a forming carried by the shutter blade substantially complemental in shape with the forming around the aperture and adapted to rest therein when the shutter blade is in a position of rest.

2. In a photographic shutter, the combination with a supporting plate having an exposure aperture therein, an annular recess extending around the exposure aperture, a movably mounted shutter blade adapted to move relative to the aperture to permit light to pass therethrough and to a position of rest, an annular forming carried by the shutter blade adapted, when the blade is in its position of rest, to form a light-tight connection with the annular forming on the supporting plate.

3. In a photographic shutter, the combination with a supporting plate having an exposure aperture therein, a forming around the aperture, a pivotally mounted shutter blade including an aperture, and similar formings on the shutter blade at each end of the aperture, the position of each forming being such that one forming may rest in and form a light-tight connection with the forming about the shutter support aperture, a shutter trigger, and means actuated by the trigger and including a spring for swinging the shutter about its pivot to make an exposure, one forming leaving the supporting plate forming as the shutter aperture passes through its path to make an exposure, the other forming coming to rest in the shutter plate forming as the exposure is completed.

4. In a photographic shutter, the combination with a supporting plate including an exposure opening, a shutter blade movably mounted on the plate, means for moving the blade to uncover and cover the aperture to make an exposure including a trigger, and a spring adapted to be tensioned and released by the trigger, cooperating embossings on the shutter blade and support normally forming a light-tight connection when the shutter blade is in a position of rest, said supporting plate embossing completely encircling the exposure opening.

5. In a photographic shutter, the combination with a supporting plate including an exposure opening, a shutter blade movably mounted on the plate, means for moving the blade to uncover and cover the aperture to make an exposure including a trigger, and a spring adapted to be tensioned and released by the trigger, cooperating embossings on the shutter blade and support normally forming a light-tight connection when the shutter blade is in a position of rest, said supporting plate embossing completely encircling the exposure opening, said embossings including interfitting curved walls so shaped that at least parts of the walls extend into telescopic relationship when said shutter is at rest.

6. In a photographic shutter, the combination with a supporting plate including an exposure opening, a shutter blade movably mounted on the plate, means for moving the blade to uncover and cover the aperture to make an exposure, including a trigger, and a spring adapted to be tensioned and released by the trigger, cooperating embossings on the shutter blade and support normally forming a light-tight connection when the shutter blade is in a position of rest, said supporting plate embossing completely encircling the exposure opening, said embossings including walls curved in cross-section so that the trigger, by tensioning and releasing said spring, may swing the blade, separating the embossings for making an exposure.

7. In a photographic shutter, the combination of a plane supporting plate including an exposure aperture, a plane shutter blade pivotally attached to the supporting plate and movable on the stud to cover and uncover the exposure aperture, a trigger, spring means operable by the trigger for actuating the shutter blade to make an exposure, and interfitting embossings bent from the plane of the supporting plate and shutter blade, the former surrounding the exposure aperture adapted to form a light-tight connection and a rebound check.

8. In a photographic shutter, the combination of a plane supporting plate including an exposure aperture, a plane shutter blade pivotally attached to the supporting plate and movable on the stud to cover and uncover the exposure aperture, a trigger, spring means operable by the trigger for actuating the shutter blade to make an exposure, an annular forming about the exposure aperture bent from the plane of the supporting plate, a pair of annular formings equally spaced from the shutter blade pivot and each adapted to engage the annular supporting plate forming, each shutter plate forming being bent from the plane of the shutter blade, the formings including walls angularly disposed in cross-section adapted to form an interfitting connection between the supporting plate and shutter blade when the latter is in a normal position of rest.

9. In a shutter for cameras, the combination with a supporting plate having an aperture therein, of a shutter blade pivotally mounted thereon, mechanism for moving the shutter blade on the supporting plate for making an exposure through the exposure opening, said shutter and supporting plates both comprising flat plates lying substantially in a plane, embossings on the shutter blade and supporting plate formed to one side of each of the flat plates, said formings being substantially complemental in shape, said pivotal support for said shutter plate including a loose fit with the shutter blade whereby said shutter plate may move at an angle to the plane of the flat material for making an exposure so that the complemental formings will interfit and prevent light from entering around the exposure opening.

MILLER R. HUTCHISON, Jr.